US011066127B2

(12) United States Patent
Kajihara et al.

(10) Patent No.: US 11,066,127 B2
(45) Date of Patent: Jul. 20, 2021

(54) HYDRAULIC VALVE UNIT, SADDLE-TYPE VEHICLE

(71) Applicant: HONDA MOTOR CO., LTD., Tokyo (JP)

(72) Inventors: Eisuke Kajihara, Wako (JP); Akira Tokito, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 16/611,221

(22) PCT Filed: May 25, 2018

(86) PCT No.: PCT/JP2018/020160
§ 371 (c)(1),
(2) Date: Nov. 6, 2019

(87) PCT Pub. No.: WO2018/221410
PCT Pub. Date: Dec. 6, 2018

(65) Prior Publication Data
US 2020/0156738 A1 May 21, 2020

(30) Foreign Application Priority Data
May 31, 2017 (JP) .............................. JP2017-108508

(51) Int. Cl.
B62M 25/08 (2006.01)
F15B 13/02 (2006.01)
(Continued)

(52) U.S. Cl.
CPC ........... B62M 25/08 (2013.01); F15B 13/022 (2013.01); F16D 25/08 (2013.01); F16D 25/14 (2013.01);
(Continued)

(58) Field of Classification Search
CPC ................. B62M 25/08; F16D 48/02; F16D 2048/0203; F16D 25/08; F16D 25/14;
(Continued)

(56) References Cited

U.S. PATENT DOCUMENTS 4,986,383 A * 1/1991 Evans ................. B60K 6/12
180/165
2002/0189252 A1 12/2002 Nirasawa et al.
(Continued)

FOREIGN PATENT DOCUMENTS

CN 1385637 12/2002
CN 103069196 4/2013
(Continued)

OTHER PUBLICATIONS

International Search Report and Written Opinion for International Application Serial No. PCT/JP2018/020160 dated Aug. 21, 2018, 6 pages.
(Continued)

Primary Examiner — David R Morris
Assistant Examiner — Lori Wu
(74) Attorney, Agent, or Firm — Amin, Turocy & Watson, LLP

(57) ABSTRACT

A hydraulic valve unit includes a main oil passage configured to bring a side of a master cylinder and a side of a slave cylinder to communicate with each other, and a bypass oil passage configured to bypass a valve mechanism of the main oil passage, wherein the main oil passage and a main section of the bypass oil passage are disposed to be arranged with respective axes aligned with each other, and the main section of the bypass oil passage is disposed at the same height as the main oil passage or at a position higher than that of the main oil passage in a state in which a valve body is attached at a predetermined attachment position.

8 Claims, 11 Drawing Sheets

(51) Int. Cl.
*F16D 25/08* (2006.01)
*F16D 48/02* (2006.01)

(52) U.S. Cl.
CPC ...... *F16D 48/02* (2013.01); *F16D 2048/0203* (2013.01)

(58) Field of Classification Search
CPC ........ F16D 25/12; F15B 13/022; F15B 21/04; F15B 1/02; F15B 19/00
See application file for complete search history.

(56) References Cited

U.S. PATENT DOCUMENTS

| | | | |
|---|---|---|---|
| 2008/0078641 A1* | 4/2008 | Iwashita | F16D 48/04 192/48.2 |
| 2016/0341265 A1* | 11/2016 | Heubner | F16D 25/12 |

FOREIGN PATENT DOCUMENTS

| | | |
|---|---|---|
| CN | 103946578 | 7/2014 |
| CN | 105987035 | 10/2016 |
| CN | 106640792 | 5/2017 |
| FR | 3017914 | 8/2015 |
| JP | 58-093530 | 6/1983 |
| JP | 62-030026 | 2/1987 |
| JP | 04-136331 | 12/1992 |
| JP | 08-312609 | 11/1996 |
| JP | 2011-075030 | 4/2011 |
| JP | 4756600 | 8/2011 |
| WO | 2015/113744 | 8/2015 |

OTHER PUBLICATIONS

Chinese Office Action for Chinese Patent Application No. 201880019037.5 dated Apr. 9, 2020.
Extended European Search Report for European Patent Application No. 18808745.6 dated Apr. 17, 2020.

* cited by examiner

HYDRAULIC VALVE UNIT, SADDLE-TYPE VEHICLE

The present invention relates to a hydraulic valve unit and a saddle-type vehicle. Priority is claimed on Japanese Patent Application No. 2017-108508, filed May 31, 2017, the content of which is incorporated herein by reference.

TECHNICAL FIELD

Background Art

In a gearbox used in a motorcycle or the like, a so-called semi-automatic gear shift system in which a gear shift operation of a gearbox is performed by a driver and a connection/disconnection operation of a clutch of the gearbox is automatically performed is known (for example, see Patent Literature 1). The gear shift system in Patent Literature 1 includes a hydraulic pressure generating apparatus for generating a hydraulic pressure in a working fluid, a slave cylinder configured to connect or disconnect a clutch using the hydraulic pressure generated by the hydraulic pressure generating apparatus, and a hydraulic pressure control device configured to control the hydraulic pressure transmitted from the hydraulic pressure generating apparatus to the slave cylinder.

CITATION LIST

Patent Literature

[Patent Literature 1]
Japanese Unexamined Patent Application, First Publication No. 2011-75030

SUMMARY OF INVENTION

Technical Problem

Incidentally, in the related art, upon assembly of a vehicle such as a motorcycle or the like or maintenance of a gear shift system, a hydraulic pressure system of the gear shift system needs to be filled with a working fluid. Here, a hydraulic pressure control device (a hydraulic valve unit) includes a valve or the like configured to control a hydraulic pressure, and a configuration of an oil passage or the like therein is complicated. For this reason, it takes time and labor for an air bleeding operation of bleeding air remaining in the oil passage after filling with the working fluid.

An aspect of the present invention is directed to providing a hydraulic valve unit and a saddle-type vehicle that are capable of easily and efficiently performing an air bleeding operation.

Solution to Problem (1) A hydraulic valve unit according to an aspect of the present invention is provided between a master cylinder configured to generate a hydraulic pressure in a working fluid and a slave cylinder actuated by the hydraulic pressure generated in the master cylinder and is configured to control transmission of the hydraulic pressure generated in the master cylinder to the slave cylinder, the hydraulic valve unit including: a valve body; a main oil passage formed in the valve body and configured to bring a side of the master cylinder and a side of the slave cylinder communicate with each other; a valve mechanism configured to open or close the main oil passage; a bypass oil passage formed in the valve body and configured to bring an upstream-side oil passage, which is provided on the side of the master cylinder with respect to the valve mechanism of the main oil passage, and a downstream-side oil passage, which is provided on the side of the slave cylinder with respect to the valve mechanism of the main oil passage, communicate with each other; and a one-way valve provided on the bypass oil passage and configured to cause the working fluid to flow in a direction from the upstream-side oil passage to the downstream-side oil passage, wherein the main oil passage and a main section of the bypass oil passage are disposed to be arranged with respective axes aligned with each other and the main section of the bypass oil passage is disposed at a same height as the main oil passage or at a position higher than that of the main oil passage in a state in which the valve body is attached at a predetermined attachment position.

(2) In the aspect of the above-mentioned (1), the hydraulic valve unit may further include a hydraulic pressure sensor configured to detect a hydraulic pressure of the working fluid, wherein the hydraulic pressure sensor may be disposed to be located below the main oil passage and the main section of the bypass oil passage while being attached to the attachment position.

(3) In the aspect of the above-mentioned (2), the main section of the bypass oil passage may be disposed at a position higher than that of the main oil passage while being attached to the attachment position, and the hydraulic pressure sensor may be disposed to be located below the main section of the bypass oil passage.

(4) In the aspect of any one of the above-mentioned (1) to (3), the bypass oil passage may include a branch oil passage that extends from the main oil passage in a direction crossing the main oil passage and that extends upward obliquely from a side of the main oil passage toward the main section of the bypass oil passage while being attached to the attachment position.

(5) In the aspect of any one of the above-mentioned (1) to (4), the hydraulic valve unit may further include an accumulator disposed to have an axis in an upward/downward direction while being attached to the attachment position.

(6) In the aspect of the above-mentioned (5), the hydraulic valve unit may further include a hydraulic pressure sensor configured to detect a hydraulic pressure of the working fluid, wherein the hydraulic pressure sensor and the accumulator are disposed to be arranged with having their respective axes aligned with each other.

(7) In the aspect of any one of the above-mentioned (1) to (6), the hydraulic valve unit may further include a bleeder member configured to bleed air contained in the working fluid, wherein the bleeder member may be disposed to be located above the bypass oil passage while being attached to the attachment position.

(8) A saddle-type vehicle according to an aspect of the present invention has the hydraulic valve unit (53) according to any one of the above-mentioned (1) to (7) that is attached to the attachment position.

Advantageous Effects of Invention

According to the aspect of the above-mentioned (1), since the main oil passage and the main section of the bypass oil passage are disposed to be arranged with respective axes aligned with each other, air mixed with the working fluid can be easily and efficiently bled from one end side of the main oil passage and the bypass oil passage in the axial direction while the hydraulic valve unit is reduced in size. In addition, since the main section of the bypass oil passage is disposed at the same height as the main oil passage or at a position higher than that of the main oil passage, the air in the bypass oil passage can be easily bled.

According to the aspect of the above-mentioned (2), since the hydraulic pressure sensor is provided below the main oil passage and the main section of the bypass oil passage, the air can be bled from the hydraulic pressure sensor to the main oil passage or the bypass oil passage thereabove, and the air bleeding operation can be easily performed.

According to the aspect of the above-mentioned (3), since the hydraulic pressure sensor is provided below the main section of the bypass oil passage disposed at a position higher than that of the main oil passage, a downward protrusion dimension of the hydraulic pressure sensor can be minimized, and the hydraulic valve unit can be reduced in size.

According to the aspect of the above-mentioned (4), since the branch oil passage of the bypass oil passage extends upward obliquely from the side of the main oil passage toward the main section of the bypass oil passage, in the branch oil passage, the air can be bled from the side of the main oil passage toward the main section of the bypass oil passage, and the air bleeding operation can be easily performed. In addition, a disposition space of the hydraulic pressure sensor can be easily secured below the main section of the bypass oil passage.

According to the aspect of the above-mentioned (5), since the accumulator is disposed to have an axis in the upward/downward direction, the air can be easily bled from the accumulator.

According to the aspect of the above-mentioned (6), by aligning the respective axes of the hydraulic pressure sensor and the accumulator, reduction in size of the hydraulic valve unit can be achieved.

According to the aspect of the above-mentioned (7), since the bleeder member is provided above the bypass oil passage which is disposed at the same height as the main oil passage or a position higher than that of the main oil passage, i.e., the bypass oil passage which is disposed at the highest position in the hydraulic valve unit, the air can be easily bled from the bleeder member.

According to the aspect of the above-mentioned (8), since the air bleeding operation in the hydraulic valve unit can be easily performed, assemblability and maintenance properties of the saddle-type vehicle can be improved.

DESCRIPTION OF EMBODIMENTS

Figure 1:
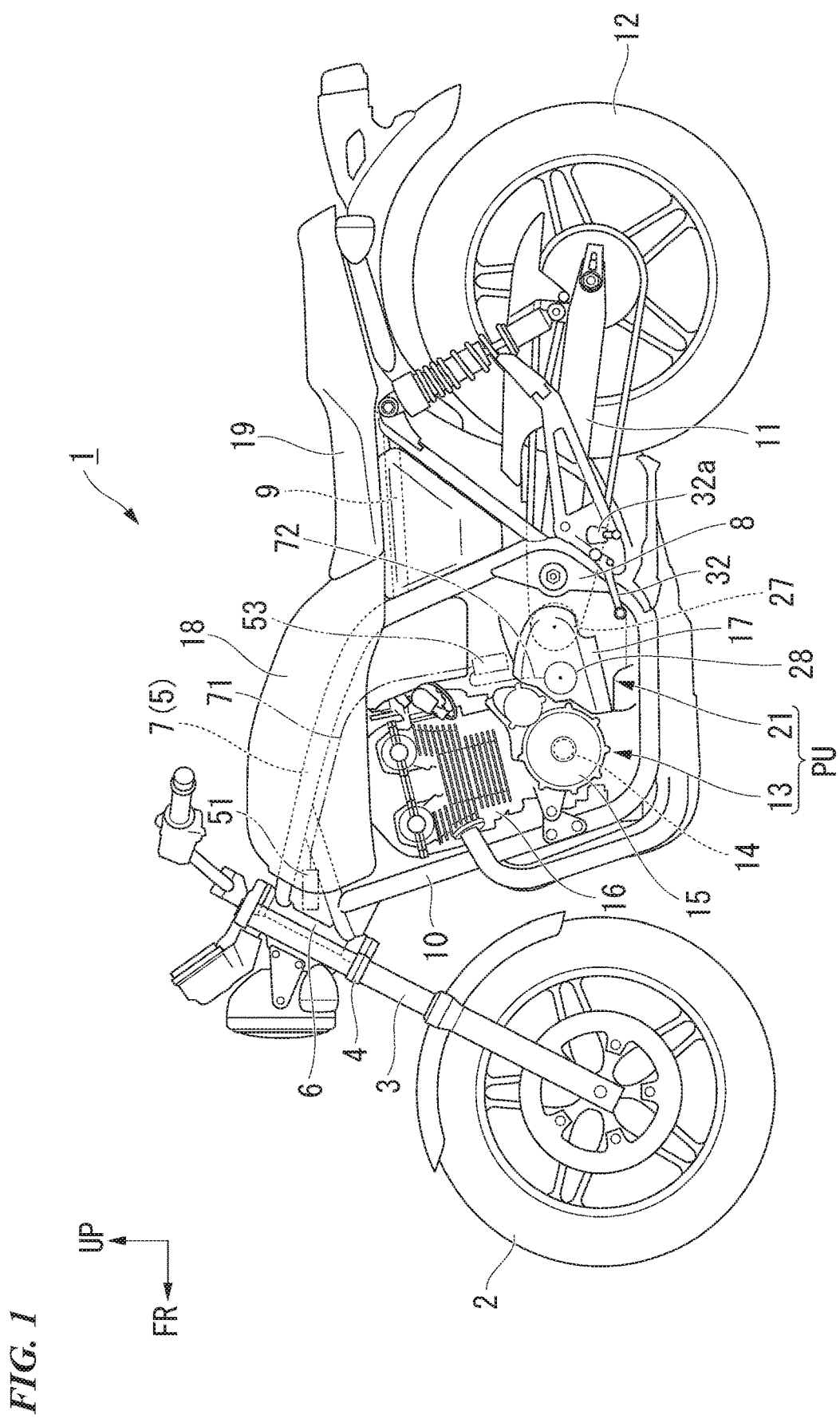
FIG. 1 is a left side view of a motorcycle according to an embodiment of the present invention.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

As shown in FIG. 1, the embodiment is applied to a motorcycle 1 that is a saddle-type vehicle. A front wheel 2 of the motorcycle 1 is supported by lower end portions of a pair of left and right front forks 3.

Upper sections of the left and right front forks 3 are supported by a head pipe 6 of a front end portion of a vehicle body frame 5 via a steering stem 4. A bar type steering handle 4a is attached onto a top bridge of the steering stem 4.

The vehicle body frame 5 includes the head pipe 6, main tubes 7 extending downward and rearward from an upper section of the head pipe 6 at a center in a vehicle width direction (a leftward/rightward direction), left and right pivot frames 8 continuous with lower sides of rear end portions of the main tubes 7, left and right down tubes 10 extending downward and rearward from a lower section of the head pipe 6 at a steeper angle than that of the main tubes 7, and a seat frame 9 continuous with rear sides of the main tubes 7 and the left and right pivot frames 8. A front end portion of a swing arm 11 is swingably axially supported by the left and right pivot frames 8. A rear wheel 12 of the motorcycle 1 is supported by a rear end portion of the swing arm 11.

A fuel tank 18 is supported above the left and right main tubes 7. A seat 19 is supported behind the fuel tank 18 and above the seat frame 9.

A power unit PU that is a prime mover of the motorcycle 1 is suspended below the left and right main tubes 7. The power unit PU is linked to the rear wheel 12 via, for example, a chain type transmission mechanism.

The power unit PU integrally has an engine 13 disposed in front thereof and a gearbox 21 disposed behind thereof. The engine 13 is a multi-cylinder engine having, for example, a rotary shaft of a crankshaft 14 that is arranged in the leftward/rightward direction (the vehicle width direction). The engine 13 has a cylinder 16 that stands on a front upper side of a crank case 15. A rear section of the crank case 15 is made as a gearbox case 17 configured to accommodate the gearbox 21.

Figure 2:
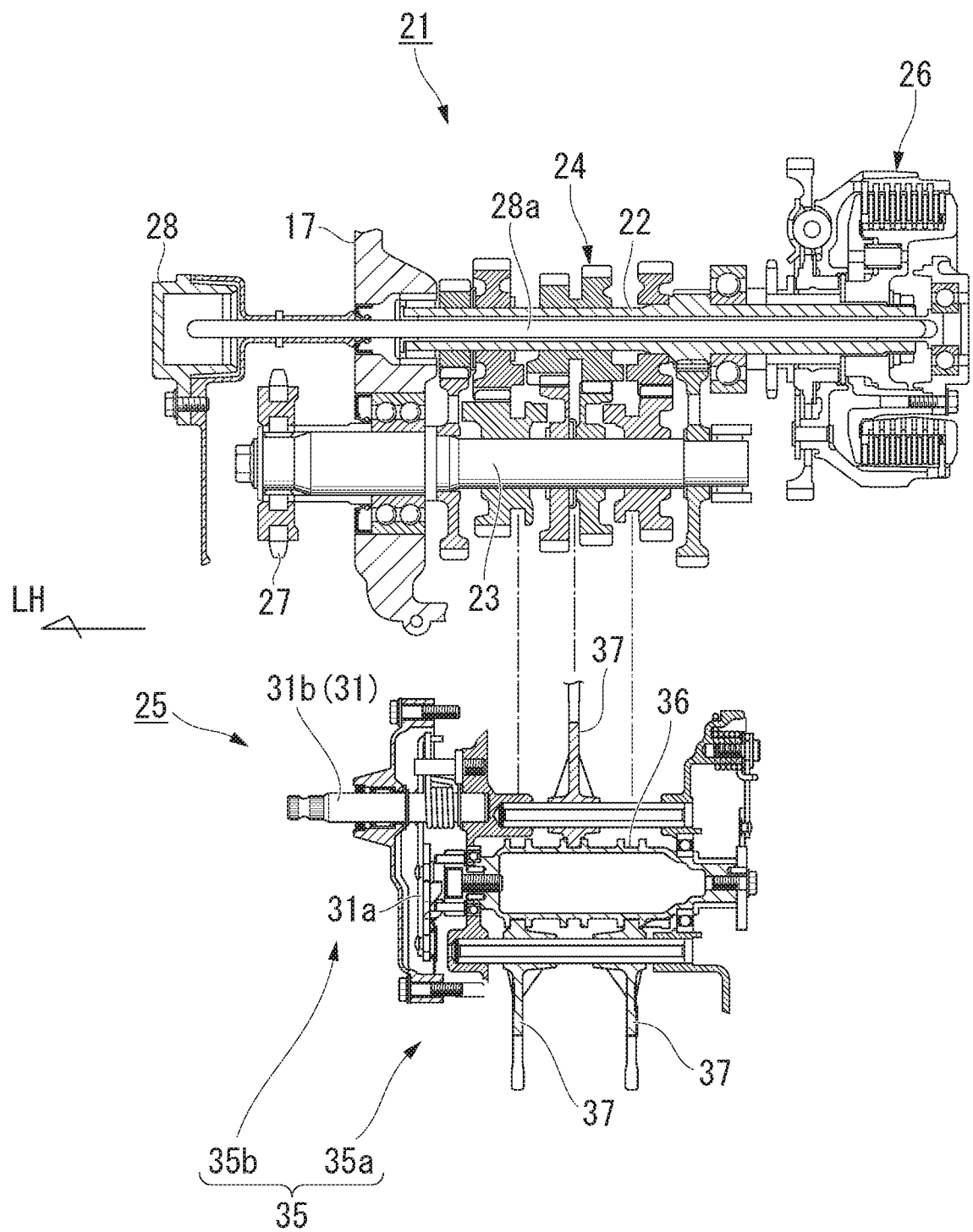
FIG. 2 is a cross-sectional view of a gearbox and a change mechanism of the motorcycle.

As shown in FIG. 2, the gearbox 21 is a stepped transmission having a main shaft 22 and a counter shaft 23, and a shifting gear group 24 that is provided across both of the shafts 22 and 23. The counter shaft 23 configures the gearbox 21 and an output shaft of the power unit PU. An end portion of the counter shaft 23 protrudes toward a rear left side of the crank case 15, and is connected to the rear wheel 12 via the chain type transmission mechanism.

Figure 3:
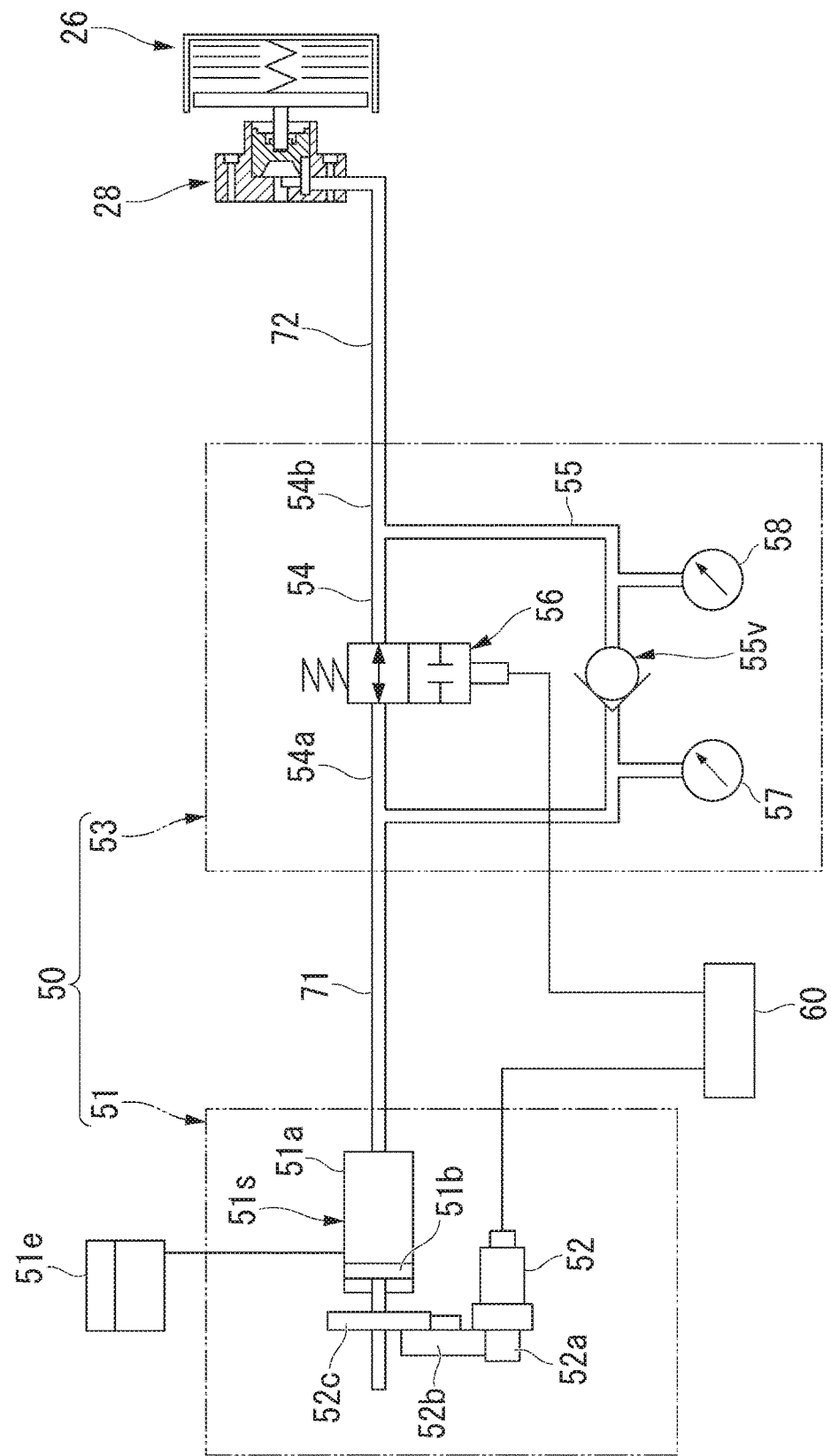
FIG. 3 is a view for schematically describing a clutch actuating system including a clutch actuator.

Referring also to FIG. 3, the main shaft 22 and the counter shaft 23 of the gearbox 21 are disposed to be arranged on front and rear sides at behind the crankshaft 14. A clutch 26 operated by a clutch actuator 50 is disposed coaxially with a right end portion of the main shaft 22. The clutch 26 is, for example, a wet multi-disk clutch, a so-called normally open clutch. That is, the clutch 26 is in a connected state in which power can be transmitted according to supply of a hydraulic pressure from the clutch actuator 50, and returns to a disconnected state in which power cannot be transmitted when a hydraulic pressure from the clutch actuator 50 is not supplied.

Referring to FIG. 2, rotational power of the crankshaft 14 is transmitted to the main shaft 22 via the clutch 26, and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding toward a rear left side of the crank case 15.

A change mechanism 25 configured to switch the gear pair of the shifting gear group 24 is accommodated at behind and above the gearbox 21. The change mechanism 25 operates a plurality of shift forks 37 according to a pattern of a lead groove formed in an outer circumference thereof and switches the gear pair used for power transmission between the shafts 22 and 23 in the shifting gear group 24 according to pivoting movement of a shift drum 36 having a hollow cylindrical shape parallel to the shafts 22 and 23.

The change mechanism 25 has a shift spindle 31 parallel to the shift drum 36.

Upon pivoting movement of the shift spindle 31, a shift arm 31*a* fixed to the shift spindle 31 pivots the shift drum 36, moves the shift forks 37 in the axial direction according to the pattern of the lead groove, and switches a gear pair configured to transmit power in the shifting gear group 24 (i.e., switches a gear range).

The shift spindle 31 has an outer shaft section 31*b* that protrudes outward (leftward) from the crank case 15 in the vehicle width direction so as to make the change mechanism 25 operatable. A shift load sensor 42 (see FIG. 4) is coaxially attached to the outer shaft section 31*b* of the shift spindle 31. A shift pedal 32 operated by a driver's foot is connected to the outer shaft section 31*b* of the shift spindle 31 (or a pivot shaft of the shift load sensor 42) via a link rod (not shown).

As shown in FIG. 1, the shift pedal 32 has a front end portion that can be vertically swingably supported by a lower section of the crank case 15 via a shaft extending in the leftward/rightward direction. A pedal section configured to hook a driver's feet placed on a step 32*a* is provided on the shift pedal 32.

As shown in FIG. 2, a shift change apparatus 35 including the shift pedal 32 and the change mechanism 25 and configured to switch a transmission gear of the gearbox 21 is configured. In the shift change apparatus 35, an assembly (the shift drum 36, the shift forks 37, and the like) configured to switch the gear range of the gearbox 21 in the gearbox case 17 is referred to as a gear shift operation section 35*a*, and an assembly (the shift spindle 31, the shift arm 31*a*, and the like), into which a gear shift operation to the shift pedal 32 is input, configured to pivot around a shaft of the shift spindle 31 and transmit the pivoting movement to the gear shift operation section 35*a* is referred to as a gear shift operation receiving section 35*b*.

Here, the motorcycle 1 employs a so-called semi-automatic gear shift system in which a gear shift operation of the gearbox 21 (a foot operation of the shift pedal 32) is performed by a driver, and a connection/disconnection operation of the clutch 26 is automatically performed by electric control according to an operation of the shift pedal 32.

Figure 4:
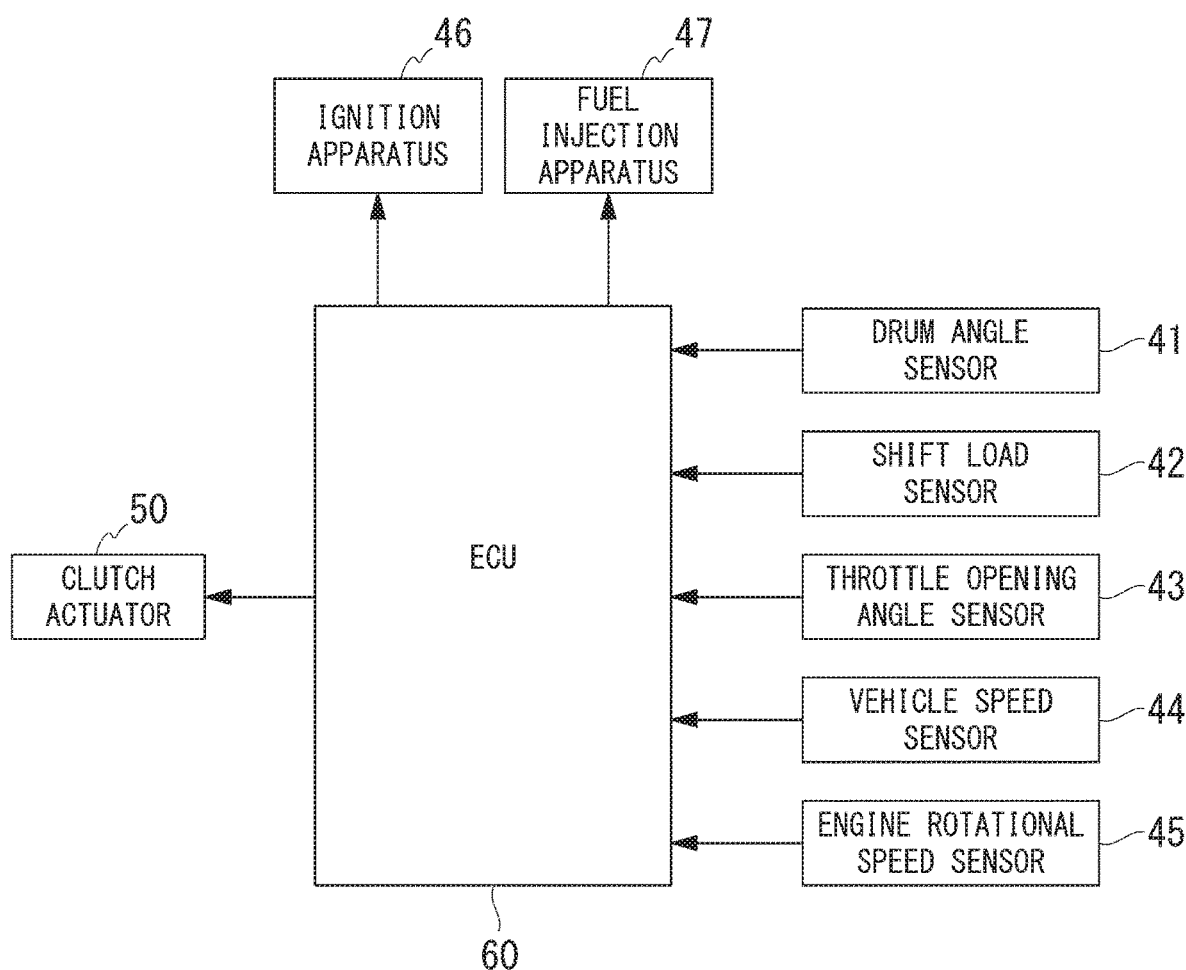
FIG. 4 is a block diagram of a gear shift system.

As shown in FIG. 4, the gear shift system includes the clutch actuator 50, an electronic control unit (ECU, a control part) 60 and various sensors 41 to 45.

The ECU 60 controls an operation of the clutch actuator 50 and controls operations of an ignition apparatus 46 and a fuel injection apparatus 47 on the basis of detection information from a drum angle sensor (a gear position sensor) 41 configured to detect a gear range from a pivot angle of the shift drum 36 and a shift load sensor (a torque sensor) 42 configured to detect an operation torque input to the shift spindle 31, and various types of vehicle state detection information or the like from a throttle opening angle sensor 43, a vehicle speed sensor 44, a engine rotational speed sensor 45, and the like. Detection information from hydraulic pressure sensors 57 and 58 of the clutch actuator 50 is also input to the ECU 60.

Referring also to FIG. 3, the clutch actuator 50 can control a liquid pressure that connects or disconnects the clutch 26 by controlling the operation through the ECU 60. The clutch actuator 50 includes a hydraulic actuator 51 and a hydraulic valve unit 53.

The hydraulic actuator 51 includes an electric motor 52 (hereinafter, simply referred to as the motor 52) serving as a drive source, and a master cylinder 51*s* driven by the motor 52.

The master cylinder 51*s* can stroke a piston 51*b* in a cylinder main body 51*a* by driving the motor 52, and supply or discharge a working fluid in the cylinder main body 51*a* with respect to a slave cylinder 28. Reference numeral 51*e* in the drawings designates a reservoir tank connected to the master cylinder 51*s*.

The piston 51*b* of the master cylinder 51*s* is connected to a drive shaft 52*a* of the motor 52 via a transmission gear 52*b* and a conversion mechanism 52*c*. Since the conversion mechanism 52*c* converts rotational movement of the drive shaft 52*a* and the transmission gear 52*b* into stroke movement of the piston 51*b*, for example, a ball-screw mechanism is used.

The hydraulic valve unit 53 is provided between the master cylinder 51*s* and the slave cylinder 28. The hydraulic valve unit 53 includes a main oil passage 54, a valve mechanism (a solenoid valve 56), a bypass oil passage 55, a one-way valve 55*v*, and the hydraulic pressure sensors 57 and 58.

The main oil passage 54 is formed to bring a side of the master cylinder 51*s* and a side of the slave cylinder 28 communicate with each other. The solenoid valve 56 opens or shuts off the main oil passage 54. The solenoid valve 56 is a so-called normally open valve.

The bypass oil passage 55 bypasses the solenoid valve 56 and brings an upstream-side oil passage 54*a* and a downstream-side oil passage 54*b* of the main oil passage 54 communicate with each other. The one-way valve 55*v* is provided on the bypass oil passage 55, causes a working fluid to flow in a direction from the upstream-side oil passage 54*a* to the downstream-side oil passage 54*b*, and restricts a flow of the working fluid in a reverse direction.

The hydraulic pressure sensors 57 and 58 detect hydraulic pressures of working fluids on the side of the master cylinder 51*s* and on the side of the slave cylinder 28 with the solenoid valve 56 sandwiched therebetween.

As shown in FIG. 2, the slave cylinder 28 is coaxially disposed on a left side of the main shaft 22. The slave cylinder 28 pushes a push rod 28*a* passing through the main shaft 22 rightward upon supply of a hydraulic pressure from the clutch actuator 50. The slave cylinder 28 operates the clutch 26 such that it is brought into a connected state via the push rod 28a by pushing the push rod 28a rightward. The slave cylinder 28 releases pushing of the push rod 28a and returns the clutch 26 to the disconnected state when the hydraulic pressure is not supplied.

While supply of the hydraulic pressure needs to be continued in order to maintain the clutch 26 in a connected state, electric power is consumed to that extent. Here, as shown in FIG. 3, the solenoid valve 56 is provided on the hydraulic valve unit 53 of the clutch actuator 50, and the solenoid valve 56 is closed after supply of the hydraulic pressure toward the clutch 26. Accordingly, energy consumption is minimized using a configuration of maintaining the hydraulic pressure supplied toward the clutch 26 and supplementing the hydraulic pressure to an extent of a decrease in pressure (recharging to an extent of leakage).

Next, actions of the clutch control system will be described with reference to the graph in FIG. 5. In the graph in FIG. 5, a vertical axis represents a supplied hydraulic pressure detected by the hydraulic pressure sensor 58, and a horizontal axis represents an elapsed time.

Upon stopping (idling) of the motorcycle 1, both of the motor 52 and the solenoid valve 56 controlled by the ECU 60 are in a state in which supply of electric power is shut off. That is, the motor 52 is in a stopped state and the solenoid valve 56 is in an open state. Here, the side of the slave cylinder 28 (a downstream side) enters a low pressure state that is lower than a touch point hydraulic pressure TP, and the clutch 26 is in an unengaged state (a disconnected state, a released state). This state corresponds to an area A in FIG. 5.

Upon starting of the motorcycle 1, when a rotational speed of the engine 13 is increased, electric power is supplied to the motor 52, and a hydraulic pressure is supplied to the slave cylinder 28 from the master cylinder 51s via the solenoid valve 56 in an open state. When the hydraulic pressure on the side of the slave cylinder 28 (the downstream side) is increased to the touch point hydraulic pressure TP or more, engaging of the clutch 26 is started, and the clutch 26 is in a half clutch state in which power is partially transmittable. Accordingly, smooth starting of the motorcycle 1 becomes possible. This state corresponds to an area B in FIG. 5.

Eventually, when the hydraulic pressure on the side of the slave cylinder 28 (the downstream side) reaches a lower limit holding hydraulic pressure LP, engaging of the clutch 26 is terminated, and a driving force of the engine 13 is entirely transmitted to the gearbox 21. This state corresponds to an area C in FIG. 5.

Then, when the hydraulic pressure on the side of the slave cylinder 28 (the downstream side) reaches an upper limit holding hydraulic pressure HP, supply of electric power to the motor 52 is stopped and generation of the hydraulic pressure is stopped while electric power is supplied to the solenoid valve 56 and the solenoid valve 56 is closed. That is, while an upstream side becomes a low pressure state as the hydraulic pressure is released, and a downstream side is maintained at a high pressure state (the upper limit holding hydraulic pressure HP). Accordingly, the clutch 26 can be maintained in a engaged state while the master cylinder 51s does not generate a hydraulic pressure, and electric power consumption can be minimized while enabling the motorcycle 1 to travel.

Figure 5:
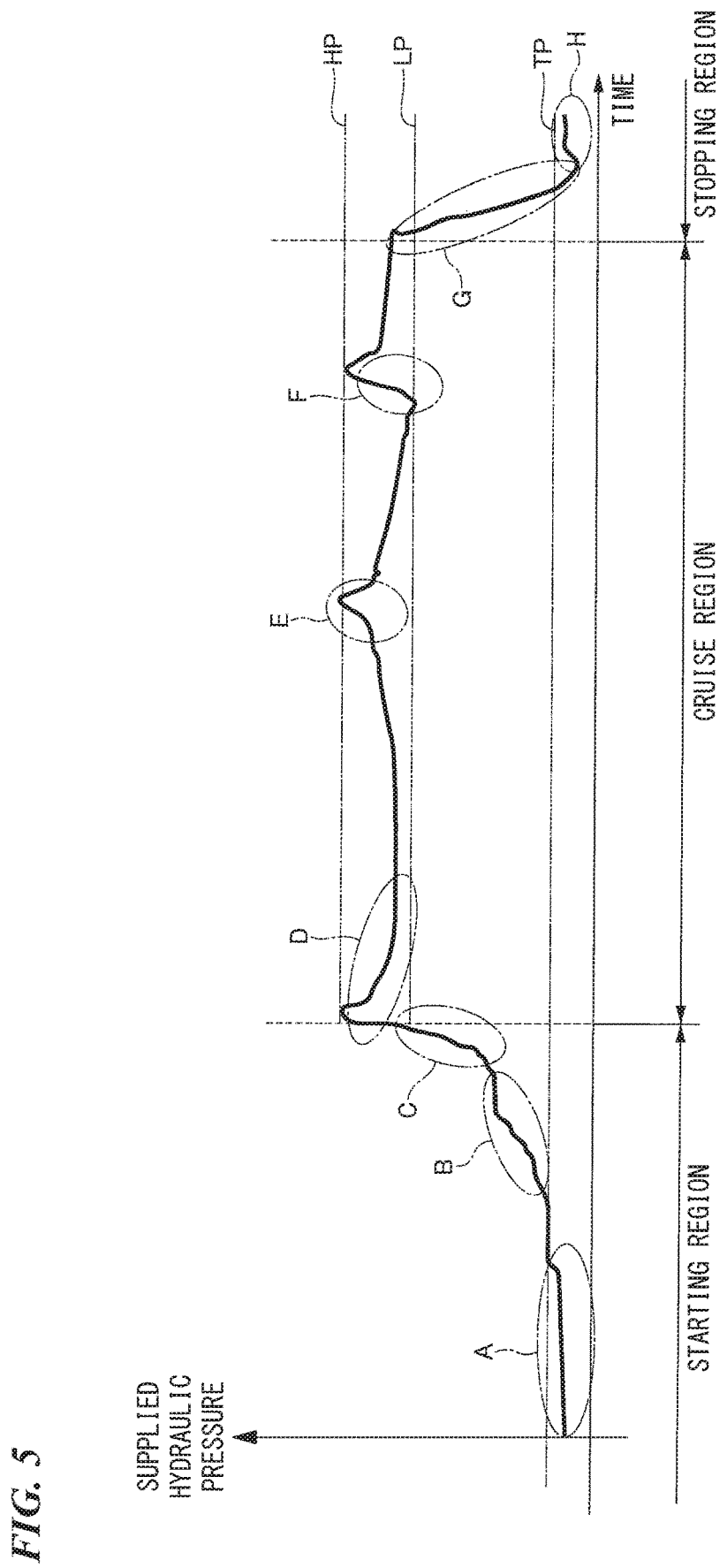
FIG. 5 is a graph showing a variation in supplied hydraulic pressure of the clutch actuator.

Even in a state in which the solenoid valve 56 is closed, the hydraulic pressure on the downstream side is gradually decreased (leaked) like an area D in FIG. 5 due to causes such as a leakage of the hydraulic pressure or a decrease in temperature due to deformation or the like of seals of the solenoid valve 56 and the one-way valve 55v. Meanwhile, like an area E in FIG. 5, there is a case in which the hydraulic pressure on the downstream side may be increased due to an increase in temperature or the like. Slight hydraulic pressure fluctuation on the downstream side can also be absorbed by an accumulator 61, and there is no increase in electric power consumption due to operations of the motor 52 and the solenoid valve 56 on every hydraulic pressure fluctuation.

Like the area E in FIG. 5, when the hydraulic pressure on the downstream side is increased to the upper limit holding hydraulic pressure HP, the solenoid valve 56 is gradually opened and the hydraulic pressure on the downstream side is relieved to an upstream side due to a decrease in supply of electric power to the solenoid valve 56 or the like.

Like an area F in FIG. 5, when the hydraulic pressure on the downstream side is decreased to the lower limit holding hydraulic pressure LP, supply of electric power to the motor 52 is started while the solenoid valve 56 is closed, and the hydraulic pressure on the upstream side is increased. When the hydraulic pressure on the upstream side exceeds the hydraulic pressure on the downstream side, the hydraulic pressure is supplemented (recharged) to the downstream side via the bypass oil passage 55 and the one-way valve 55v. When the hydraulic pressure on the downstream side reaches the upper limit holding hydraulic pressure HP, supply of electric power to the motor 52 is stopped and generation of the hydraulic pressure is stopped. Accordingly, the hydraulic pressure on the downstream side is maintained between the upper limit holding hydraulic pressure HP and the lower limit holding hydraulic pressure LP, and the clutch 26 is maintained in a engaged state.

Upon stopping of the motorcycle 1, supply of electric power to the motor 52 and the solenoid valve 56 is stopped together. Accordingly, the master cylinder 51s stops generation of the hydraulic pressure and stops supply of the hydraulic pressure to the slave cylinder 28. The solenoid valve 56 is in a closed state, and the hydraulic pressure in the downstream-side oil passage 54b is returned to a reservoir tank 51e. Accordingly, the side of the slave cylinder 28 (the downstream side) is a low pressure state that is lower than the touch point hydraulic pressure TP, and the clutch 26 is in an unengaged state. This state corresponds to areas G and H in FIG. 5.

Next, a specific configuration of the hydraulic valve unit 53 will be described.

As shown in FIGS. 6 to 11, the hydraulic valve unit 53 includes a valve body 53a. The valve body 53a forms a housing of the hydraulic valve unit 53, in which the main oil passage 54 and the bypass oil passage 55 are formed.

Figure 6:
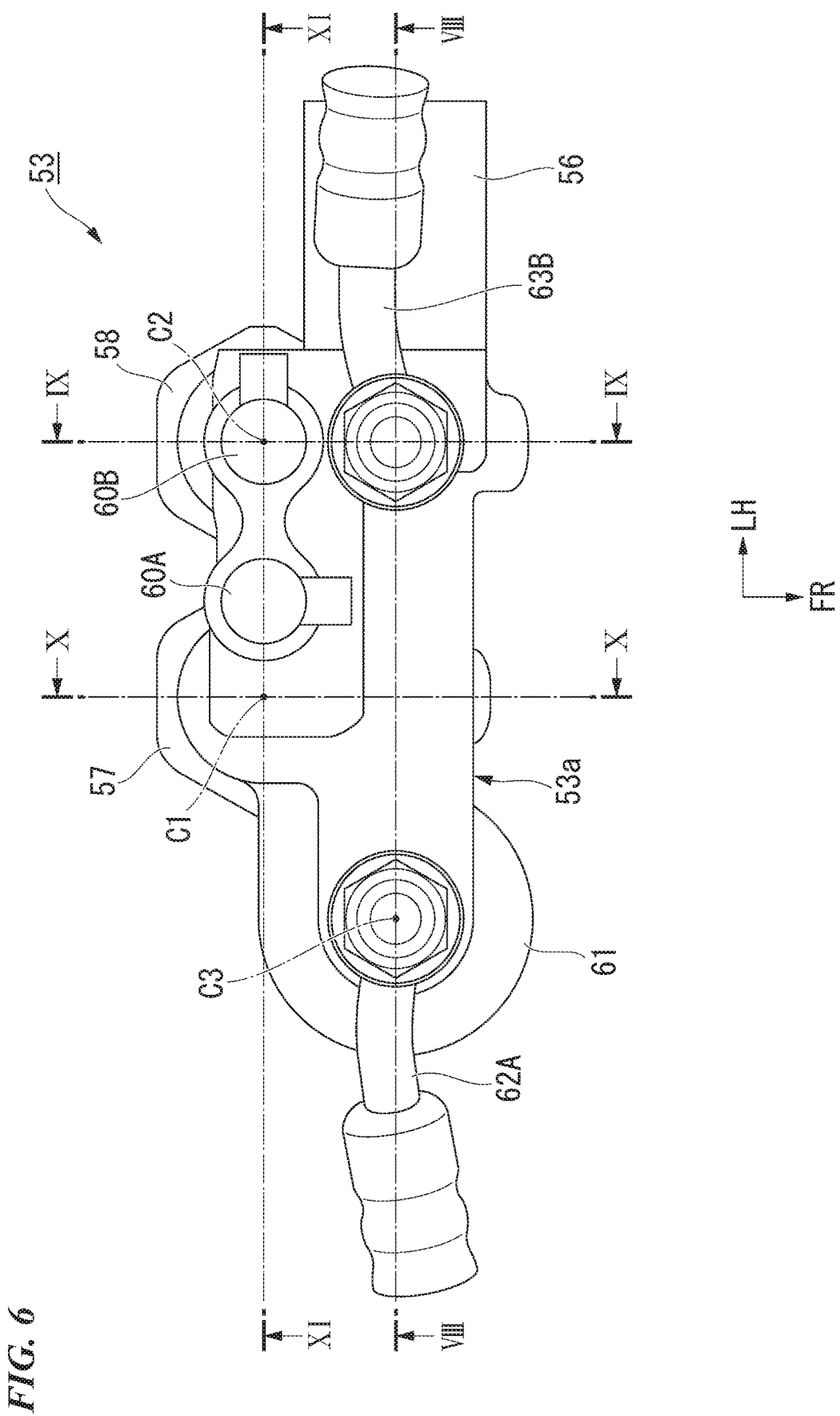
FIG. 6 is a plan view of a hydraulic valve unit of the clutch actuator.
Figure 7:
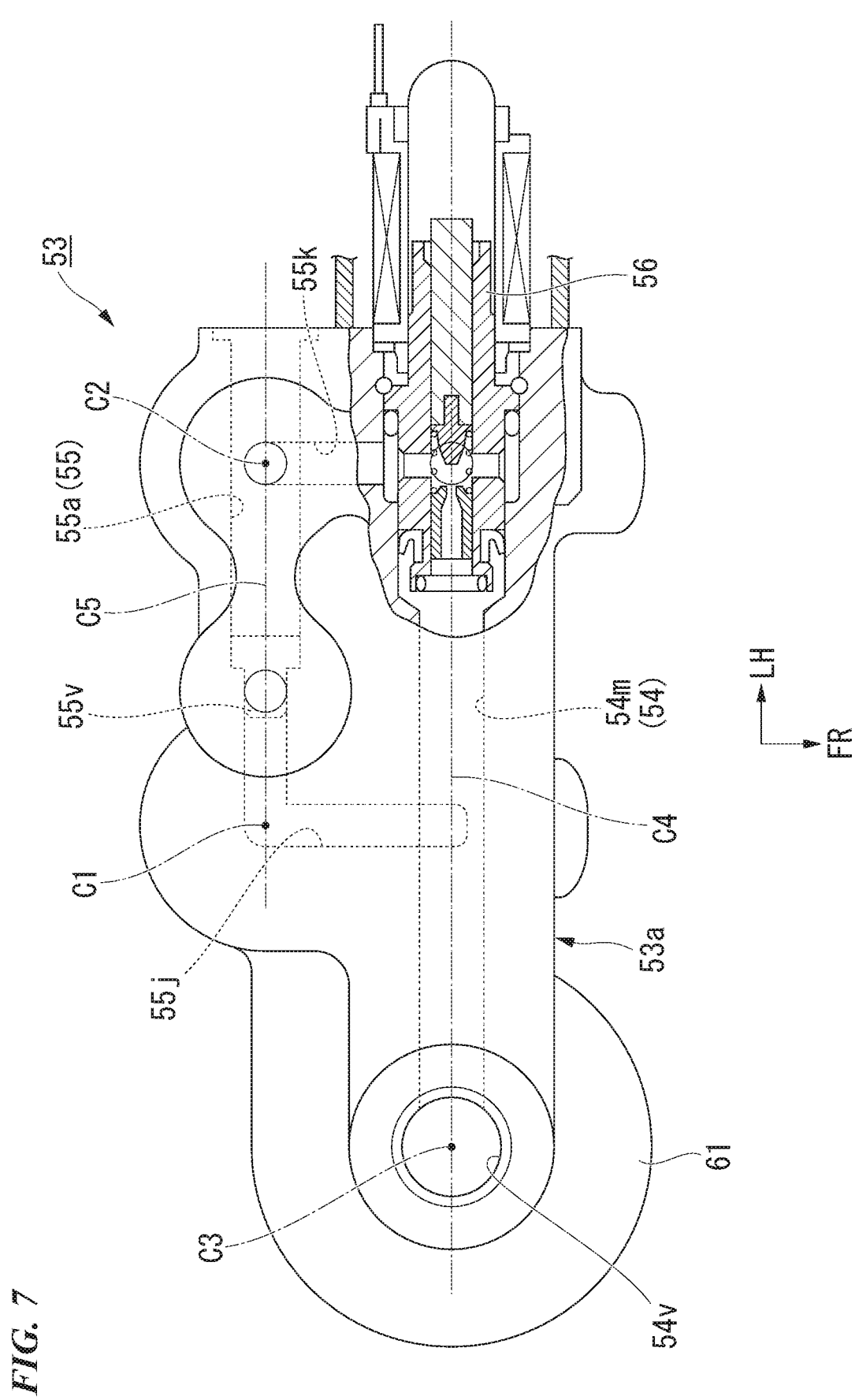
FIG. 7 is a plan view including a cross-section of a part of the hydraulic valve unit.

FIGS. 6 and 7 are plan views showing a state in which the hydraulic valve unit 53 is attached at a predetermined attachment position in a vehicle body of the motorcycle 1 in a plan view. For example, the hydraulic valve unit 53 is disposed behind the cylinder 16 of the engine 13 and above the gearbox 21 (see FIG. 1). In the hydraulic valve unit 53, the main oil passage 54 and the bypass oil passage 55 are disposed in the leftward/rightward direction, and axes C1, C2 and C3 of the hydraulic pressure sensors 57 and 58 and the accumulator 61 are disposed along an inclination of the cylinder 16. FIGS. 6 and 7 show plan views along the axes C1, C2 and C3 of the hydraulic pressure sensors 57 and 58 and the accumulator 61. The hydraulic actuator 51 is disposed behind the head pipe 6.

Figure 8:
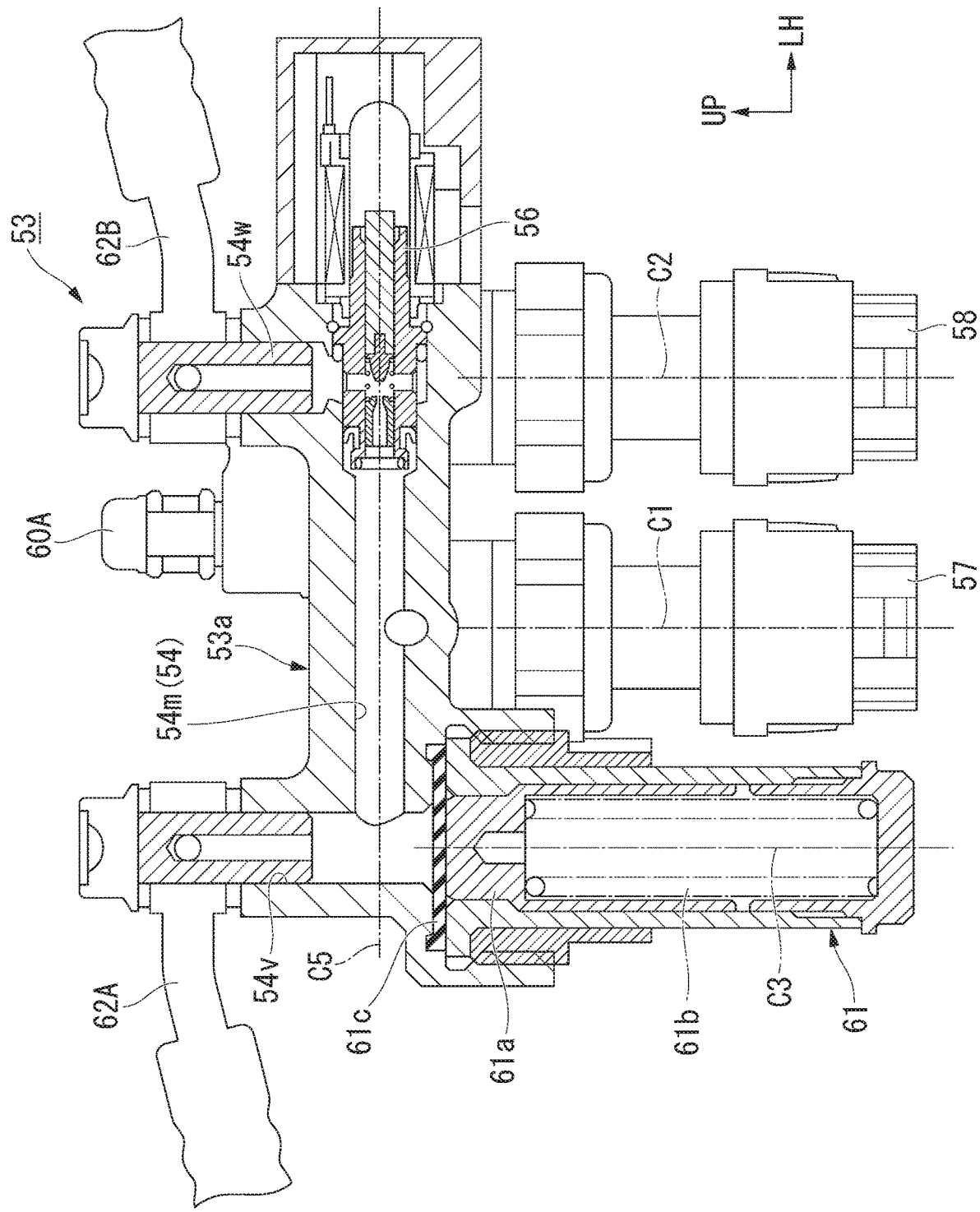
FIG. 8 is a cross-sectional view taken along line VIII-VIII in FIG. 6.

As shown in FIGS. 7 and 8, in a state in which the hydraulic valve unit 53 is attached at a predetermined attachment position of the vehicle body, the main oil passage 54 is formed in a linear shape such that a main section 54*m* thereof extends in a substantially horizontal direction. Reference character C4 in the drawings designates a central axis in an extension direction of the main section 54*m*. Standing-up flow paths 54*v* and 54*w* standing upward are formed in both end portions of the main section 54*m* of the main oil passage 54. Banjo members 62A and 62B are connected to the standing-up flow paths 54*v* and 54*w*.

Referring together to FIG. 3, the other ends of a master-side connecting pipeline 71 and a slave-side connecting pipeline 72, one ends of which are connected to the master cylinder 51*s* and the slave cylinder 28, are connected to the banjo members 62A and 62B. The master-side connecting pipeline 71 connects the hydraulic valve unit 53 and the master cylinder 51*s* of the hydraulic actuator 51. The slave-side connecting pipeline 72 connects the hydraulic valve unit 53 and the slave cylinder 28.

The solenoid valve 56 is provided on an end portion of the main section 54*m* of the main oil passage 54 on the side of the standing-up flow path 54*w*.

In the main oil passage 54, the main section 54*m* and the standing-up flow path 54*v* become the upstream-side oil passage 54*a* on the side of the master cylinder 51*s* with respect to the solenoid valve 56, and the standing-up flow path 54*w* becomes the downstream-side oil passage 54*b* on the side of the slave cylinder 28 with respect to the solenoid valve 56.

Meanwhile, the main oil passage 54 shortens the standing-up flow paths 54*v* and 54*w* as much as possible, and shortens a length of the oil passage from the banjo member 62A to the banjo member 62B via the main oil passage 54 as much as possible. Accordingly, the hydraulic pressure can be transmitted quickly, and the clutch 26 can be operated with good response.

As shown in FIG. 7, the bypass oil passage 55 has a main section 55*a* and branch oil passages 55*j* and 55*k*. The main section 55*a* of the bypass oil passage 55 is parallel to the main section 54*m* of the main oil passage 54, and formed in a linear shape extending in a substantially horizontal direction. Reference character C5 in the drawings designates a central axis in an extension direction of the main section 55*a*. The main section 55*a* of the bypass oil passage 55 is disposed parallel to the main oil passage 54 when seen in a plan view in a state in which the valve body 53*a* is attached at a predetermined attachment position of the vehicle body. Further, as shown in FIGS. 9 and 10, the main section 55*a* of the bypass oil passage 55 is disposed at a position higher than the main oil passage 54.

The branch oil passages 55*j* and 55*k* are formed to connect both end portions of the main section 55*a* of the bypass oil passage 55 to the main section 54*m* of the main oil passage 54. The branch oil passages 55*j* and 55*k* extend from the main section 54*m* of the main oil passage 54 in a direction crossing the main oil passage 54.

Figure 9:
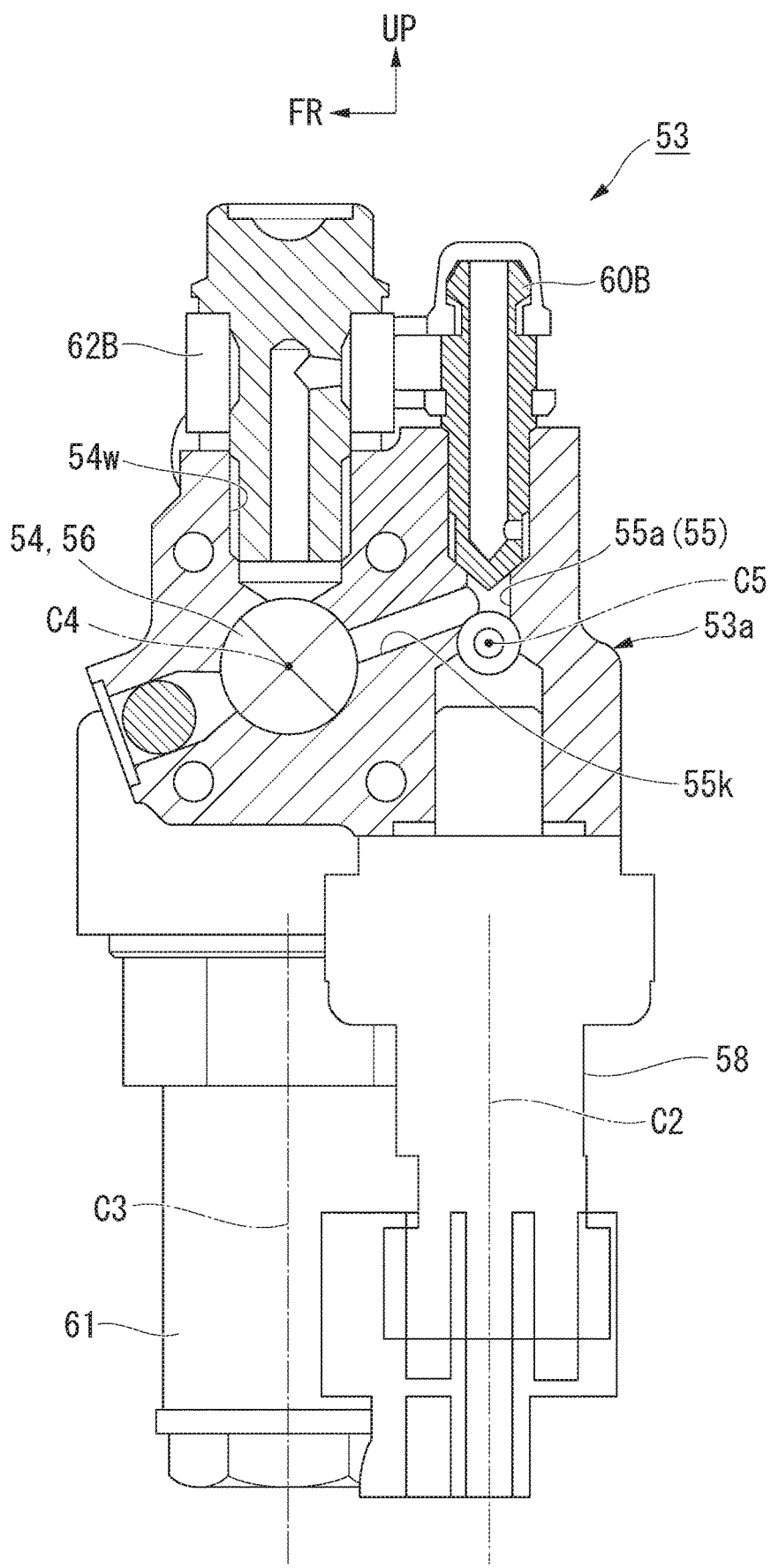
FIG. 9 is a cross-sectional view taken along line IX-IX in FIG. 6.
Figure 10:
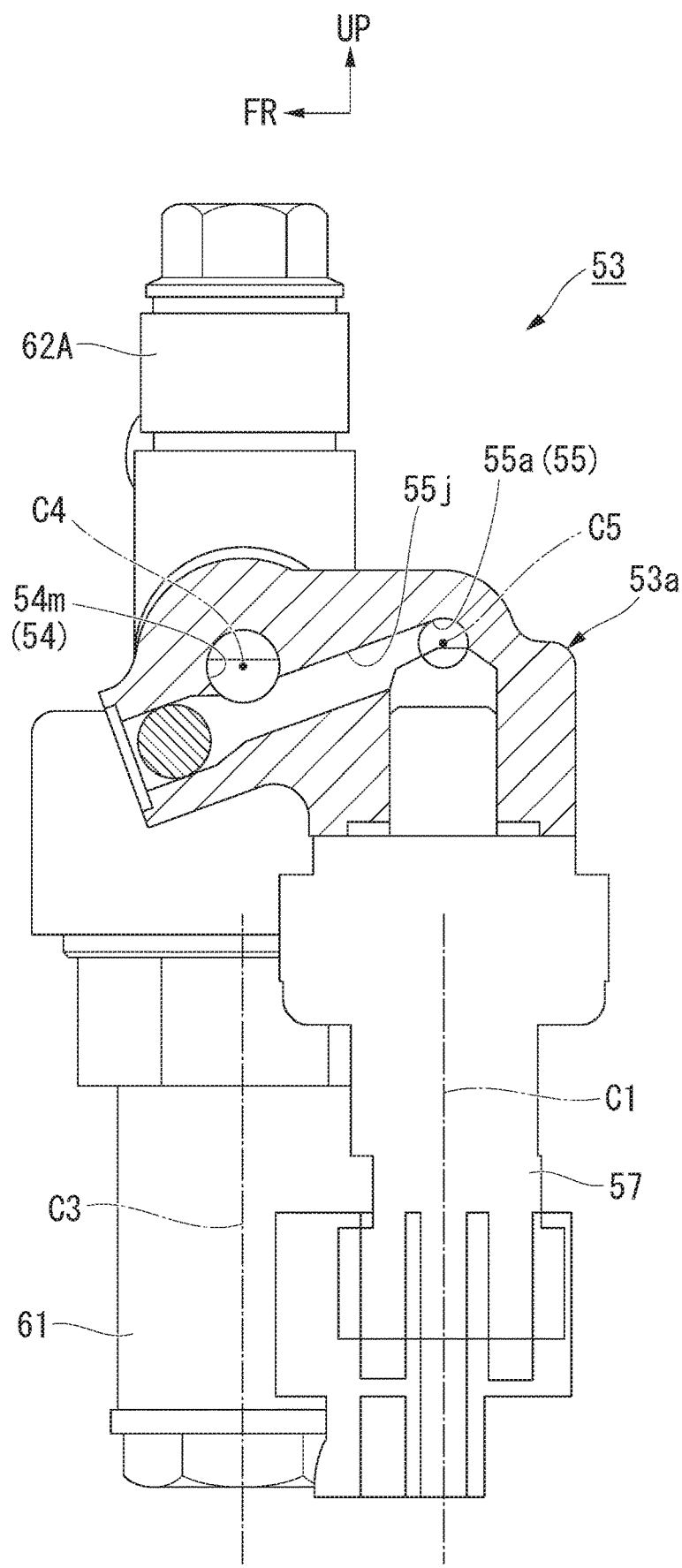
FIG. 10 is a cross-sectional view taken along line X-X in FIG. 6.

Referring together to FIGS. 9 and 10, the branch oil passages 55*j* and 55*k* are formed to extend upward obliquely from the side of the main section 54*m* of the main oil passage 54 toward the main section 55*a* of the bypass oil passage 55 in a state in which the valve body 53*a* is attached at a predetermined attachment position of the vehicle body. Portions of the branch oil passages 55*j* and 55*k* that open downward obliquely outside the valve body 53*a* are closed by press-fitting of steel balls.

The hydraulic pressure sensors 57 and 58 are disposed below the main section 55*a* of the bypass oil passage 55 to extend in the upward/downward direction, and upper end portions of the hydraulic pressure sensors 57 and 58 are connected to the main section 55*a*. The main section 55*a* of the bypass oil passage 55 is disposed at a position higher than that of the main oil passage 54, and the branch oil passages 55*j* and 55*k* extends upward obliquely toward the main section 55*a* of the bypass oil passage 55. For this reason, a disposition space of the hydraulic pressure sensors 57 and 58 is easily secured below the main section 55*a* of the bypass oil passage 55, and contributes to reduction in size of the hydraulic valve unit 53.

Figure 11:
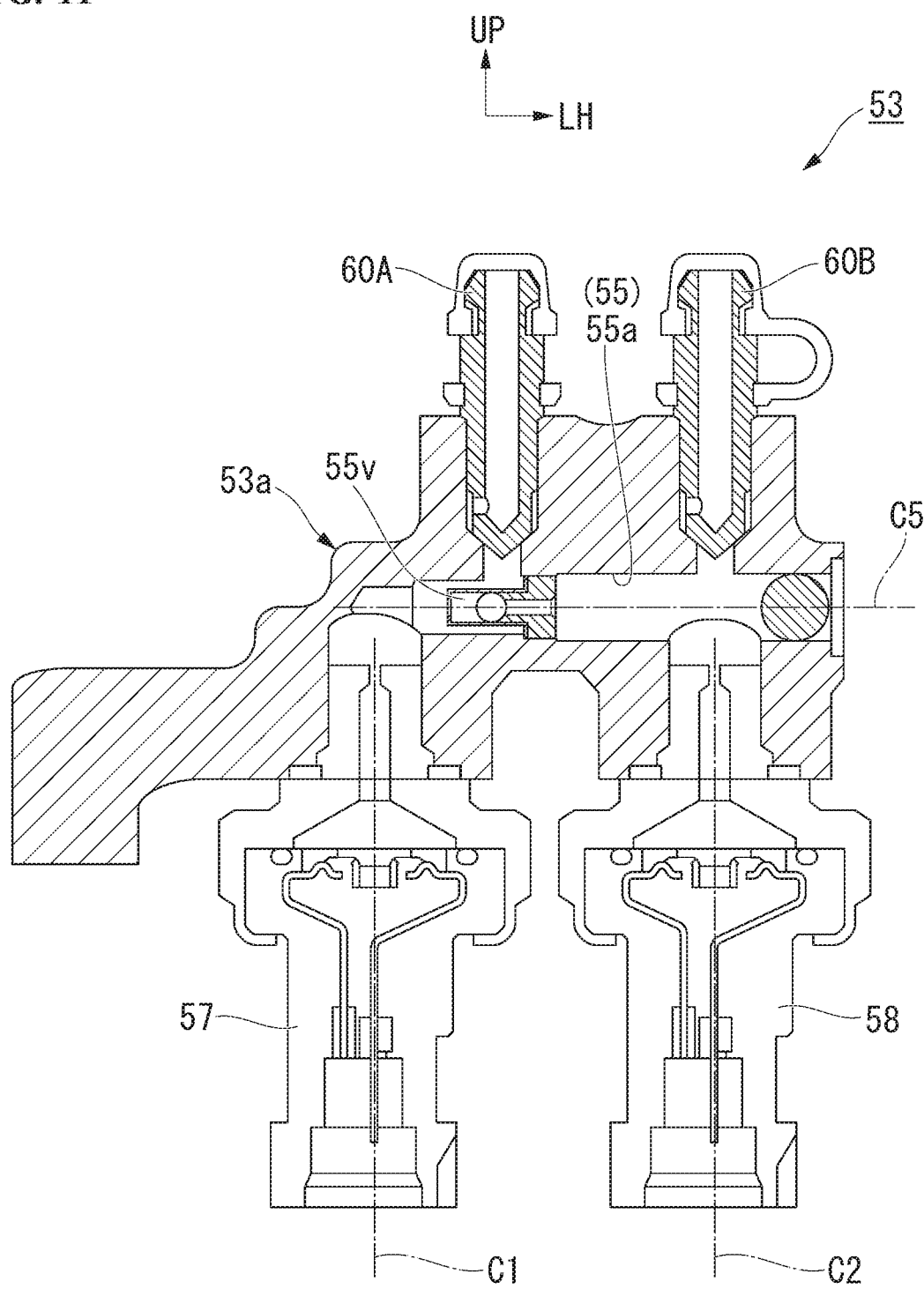
FIG. 11 is a cross-sectional view taken along line XI-XI in FIG. 6.

As shown in FIG. 11, the hydraulic pressure sensors 57 and 58 are provided on the bypass oil passage 55, and disposed upstream and downstream from the one-way valve 55*v*. Accordingly, the hydraulic pressure sensors 57 and 58 detect hydraulic pressures of the working fluid on the side of the master cylinder 51*s* and on the side of the slave cylinder 28.

Referring together to FIG. 8, the hydraulic pressure sensors 57 and 58 are provided to be disposed below the main oil passage 54 and the main section 55*a* of the bypass oil passage 55 in a state in which the valve body 53*a* is attached at a predetermined attachment position of the vehicle body. Further, the hydraulic pressure sensors 57 and 58 are disposed to be located below the main section 55*a* of the bypass oil passage 55 disposed at a position higher than that of the main oil passage 54. The hydraulic pressure sensors 57 and 58 are disposed such that the central axes C1 and C2 are directed in the upward/downward direction. A portion of the main section 55*a* of the bypass oil passage 55 that opens rightward in FIG. 11 outside the valve body 53*a* is closed by press-fitting of a steel ball. The one-way valve 55*v* is inserted from the opening portion of the main section 55*a* before closing of the opening portion.

The hydraulic valve unit 53 further includes the accumulator 61 and bleeder members 60A and 60B.

As shown in FIG. 8, the accumulator 61 is connected to a merging section of the main section 54*m* and the standing-up flow path 54*v* of the main oil passage 54. The accumulator 61 has a piston 61*a*, a coil spring 61*b* configured to bias the piston 61*a* toward the main oil passage 54, and a diaphragm 61*c* configured to separate a side of the piston 61*a* and the main oil passage 54. The diaphragm 61*c* of the accumulator 61 is pressed when the hydraulic pressure of the main oil passage 54 is increased. Accordingly, the piston 61*a* is pushed against an elastic force of the coil spring 61*b* via the diaphragm 61*c*, and the accumulator 61 stores the hydraulic pressure. In the accumulator 61, when the hydraulic pressure of the main oil passage 54 is decreased, the piston 61*a* is moved toward the main oil passage 54 by the elastic force of the coil spring 61*b*, and the working fluid is returned to the main oil passage 54 to increase the hydraulic pressure and absorb fluctuation of the hydraulic pressure.

Such an accumulator 61 is disposed parallel to the hydraulic pressure sensors 57 and 58 and have the central axis C3 in the upward/downward direction.

As shown in FIG. 11, the bleeder members 60A and 60B are used when an air bleeding operation of bleeding air contained in the working fluid is performed. The bleeder members 60A and 60B are disposed to be located above the bypass oil passage 55 disposed at a position higher than that of the main oil passage 54 in a state in which the valve body 53*a* is attached at a predetermined attachment position of the vehicle body. Here, the bleeder member 60A is disposed above the one-way valve 55*v*.

As described above, the hydraulic valve unit 53 of the embodiment includes the valve body 53a, the main oil passage 54 formed in the valve body 53a and configured to bring the side of the master cylinder 51s and the side of the slave cylinder 28 communicate with each other, the solenoid valve 56 configured to open or close the intermediate area of the main oil passage 54, the bypass oil passage 55 formed in the valve body 53a and configured to bring the upstream-side oil passage Ma, which is provided on the side of the master cylinder 51s with respect to the solenoid valve 56 of the main oil passage 54, and the downstream-side oil passage 54b, which is provided on the side of the slave cylinder 28 with respect to the solenoid valve 56 of the main oil passage 54, communicate with each other, and the one-way valve 55v provided on the bypass oil passage 55 and configured to cause the working fluid to flow in the direction from the upstream-side oil passage 54a to the downstream-side oil passage 54b, and when seen in a plan view in a state in which the valve body 53a is attached at a predetermined attachment position, the main oil passage 54 and the main section 55a of the bypass oil passage 55 are disposed in parallel, and the main section 55a of the bypass oil passage 55 is disposed at a position higher than that of the main oil passage 54.

As a result, when the main oil passage 54 and the main section 55a of the bypass oil passage 55 are disposed in parallel while being seen in a plan view, in comparison with the case in which the main oil passage 54 and the main section 55a of the bypass oil passage 55 are disposed in parallel in the upward/downward direction, air mixed with the working fluid can be easily bled. In addition, when the main oil passage 54 and the main section 55a of the bypass oil passage 55 are disposed to approach each other, the hydraulic valve unit 53 can be formed in a thin compact shape.

Then, when the main oil passage 54 and the main section 55a of the bypass oil passage 55 are arranged with the respective axes C4 and C5 aligned with each other, the air mixed with the working fluid can be easily and efficiently bled from one end sides of the main oil passage 54 and the bypass oil passage 55 in the axial direction while the hydraulic valve unit 53 is reduced in size. In addition, when the main section 55a of the bypass oil passage 55 is disposed at the same height as the main oil passage 54 or at a position higher than that of the main oil passage 54, the air in the bypass oil passage 55 can be easily bled.

In addition, the hydraulic valve unit 53 further includes the hydraulic pressure sensors 57 and 58 configured to detect a hydraulic pressure of the working fluid, and disposed to be located below the main oil passage 54 and the main section 55a of the bypass oil passage 55 in a state in which the hydraulic pressure sensors 57 and 58 are attached to the attachment position. Accordingly, when the hydraulic pressure sensors 57 and 58 are provided below the main oil passage 54 and the main section 55a of the bypass oil passage 55, the air can be bled upward from the hydraulic pressure sensors 57 and 58, and the air bleeding operation can be easily performed.

Further, in a state in which the hydraulic valve unit 53 is attached to the attachment position, the main section 55a of the bypass oil passage 55 is disposed at a position higher than that of the main oil passage 54, and the hydraulic pressure sensors 57 and 58 are disposed at a position below the main section 55a of the bypass oil passage 55. Accordingly, when the hydraulic pressure sensors 57 and 58 are provided below the main section 55a of the bypass oil passage 55 disposed at a position higher than that of the main oil passage 54, a dimension of downward protrusions of the hydraulic pressure sensors 57 and 58 can be minimized, and the hydraulic valve unit 53 can be reduced in size.

In addition, the bypass oil passage 55 of the hydraulic valve unit 53 includes the branch oil passages 55j and 55k extending from the main oil passage 54 in the direction crossing the main oil passage 54 and extending upward obliquely from the side of the main oil passage 54 toward the main section 55a of the bypass oil passage 55 while being attached to the attachment position. Accordingly, since the branch oil passages 55j and 55k of the bypass oil passage 55 extend upward obliquely from the side of the main oil passage 54 toward the main section 55a of the bypass oil passage 55, in the branch oil passages 55j and 55k, the air can be bled toward the main section 55a of the bypass oil passage 55, and the air bleeding operation can be easily performed. In addition, the disposition space of the hydraulic pressure sensors 57 and 58 can be easily secured below the main section 55a of the bypass oil passage 55.

In addition, the hydraulic valve unit 53 further includes the accumulator 61 disposed to have the axis C3 in the upward/downward direction while being attached to the attachment position. When the accumulator 61 is disposed to have the axis C3 in the upward/downward direction, the air can be easily bled from the accumulator 61.

In addition, since the hydraulic pressure sensors 57 and 58 and the accumulator 61 are arranged with having their respective axes C1, C2 and C3 aligned with each other, reduction in size of the hydraulic valve unit 53 can be achieved in this respect.

Further, the hydraulic valve unit 53 further includes the bleeder members 60A and 60B configured to bleed the air contained in the working fluid, and the bleeder members 60A and 60B are disposed to be located above the bypass oil passage 55 while being attached to the attachment position. Accordingly, when the bleeder members 60A and 60B are provided above the bypass oil passage 55 disposed at the same height as the main oil passage 54 or at a position higher than that of the main oil passage 54, the air can be easily bled from the bleeder members 60A and 60B.

In addition, in the motorcycle 1, the above-mentioned hydraulic valve unit 53 is attached at a predetermined attachment position. Accordingly, since the air bleeding operation in the hydraulic valve unit 53 can be easily performed, assemblability and maintenance properties of the motorcycle 1 can be improved.

In addition, in the motorcycle 1, the attachment position of the hydraulic valve unit 53 is provided behind the engine 13 and around the gearbox 21. Accordingly, when the hydraulic valve unit 53 is provided behind the engine 13 and around the gearbox 21, the vehicle body space of the motorcycle 1 can be effectively used, an accommodating space can be reduced by the hydraulic valve unit 53, or an increase in size of the vehicle body can be minimized.

Further, the present invention is not limited to the above-mentioned embodiment described with reference to the accompanying drawings, various variants are considered within the technical scope thereof.

For example, the attachment position of the hydraulic valve unit 53 is not limited to the position exemplified in the embodiment, and the hydraulic valve unit may be attached to an appropriate another place.

In addition, all vehicles on which a driver rides on the vehicle body are included as the saddle-type vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included, and a vehicle in which an electric motor is included in a prime mover may also be included.

Then, the configuration in the embodiment is an example of the present invention, and various modifications may be made without departing from the scope of the present invention.

REFERENCE SIGNS LIST

1 Motorcycle (saddle-type vehicle)
13 Engine
16 Cylinder
21 Gearbox
28 Slave cylinder
50 Clutch actuator
51 Hydraulic actuator
51s Master cylinder
53 Hydraulic valve unit
53a Valve body
54 Main oil passage
54a Upstream-side oil passage
54b Downstream-side oil passage
55 Bypass oil passage
55j Branch oil passage
55k Branch oil passage
55a Main section
55v One-way valve
56 Solenoid valve (valve mechanism)
57 Upstream-side hydraulic pressure sensor
58 Downstream-side hydraulic pressure sensor
60A, 60B Bleeder member
61 Accumulator
C1 to C5 Axes

What is claim is:

1. A hydraulic valve unit that is provided between a master cylinder configured to generate a hydraulic pressure in a working fluid and a slave cylinder actuated by the hydraulic pressure generated in the master cylinder and that is configured to control transmission of the hydraulic pressure generated in the master cylinder to the slave cylinder, the hydraulic valve unit comprising:
   a valve body;
   a main oil passage formed in the valve body and configured to bring a side of the master cylinder and a side of the slave cylinder communicate with each other;
   a valve mechanism configured to open or close the main oil passage;
   a bypass oil passage formed in the valve body and configured to bring an upstream-side oil passage, which is provided on the side of the master cylinder with respect to the valve mechanism of the main oil passage, and a downstream-side oil passage, which is provided on the side of the slave cylinder with respect to the valve mechanism of the main oil passage, communicate with each other; and
   a one-way valve provided on the bypass oil passage and configured to cause the working fluid to flow in a direction from the upstream-side oil passage to the downstream-side oil passage,
   wherein the main oil passage and a main section of the bypass oil passage are disposed to be arranged with respective axes aligned with each other and the main section of the bypass oil passage is disposed at a same height as the main oil passage or at a position higher than that of the main oil passage in a state in which the valve body is attached at a predetermined attachment position.

2. The hydraulic valve unit according to claim 1, further comprising a hydraulic pressure sensor configured to detect a hydraulic pressure of the working fluid,
   wherein the hydraulic pressure sensor is disposed to be located below the main oil passage and the main section of the bypass oil passage while being attached to the attachment position.

3. The hydraulic valve unit according to claim 2, wherein the main section of the bypass oil passage is disposed at a position higher than that of the main oil passage while being attached to the attachment position, and
   the hydraulic pressure sensor is disposed to be located below the main section of the bypass oil passage.

4. The hydraulic valve unit according to claim 1, wherein the bypass oil passage comprises a branch oil passage that extends from the main oil passage in a direction crossing the main oil passage and that extends upward obliquely from a side of the main oil passage toward the main section of the bypass oil passage while being attached to the attachment position.

5. The hydraulic valve unit according to claim 1, further comprising an accumulator disposed to have an axis in an upward/downward direction while being attached to the attachment position.

6. The hydraulic valve unit according to claim 5, further comprising a hydraulic pressure sensor configured to detect a hydraulic pressure of the working fluid, wherein the hydraulic pressure sensor and the accumulator are disposed to be arranged with having their respective axes aligned with each other.

7. The hydraulic valve unit according to claim 1, further comprising a bleeder member configured to bleed air contained in the working fluid,
   wherein the bleeder member is disposed to be located above the bypass oil passage while being attached to the attachment position.

8. A saddle-type vehicle in which the hydraulic valve unit according to claim 1 is attached to the attachment position.

* * * * *